Oct. 10, 1967  M. COSTELLO  3,346,004
DIAPHRAGM CONTROL VALVE WITH HOLLOW GUIDE STEM
Filed Nov. 18, 1965  2 Sheets-Sheet 1

INVENTOR.
MILTON COSTELLO
BY Percy Freeman
ATTORNEY

Oct. 10, 1967   M. COSTELLO   3,346,004
DIAPHRAGM CONTROL VALVE WITH HOLLOW GUIDE STEM
Filed Nov. 18, 1965   2 Sheets-Sheet 2

INVENTOR.
MILTON COSTELLO
BY
ATTORNEY

United States Patent Office 3,346,004
Patented Oct. 10, 1967

3,346,004
DIAPHRAGM CONTROL VALVE WITH HOLLOW GUIDE STEM
Milton Costello, 1400 Wantagh Ave., Wantagh, N.Y. 11794
Filed Nov. 18, 1965, Ser. No. 508,494
9 Claims. (Cl. 137—271)

ABSTRACT OF THE DISCLOSURE

This relates to a hydraulic valve construction including a valve body having a pair of inlet and outlet chambers, and inlet and outlet openings communicating with respective inlet and outlet chambers, said body having an intermediate opening spaced between the inlet and outlet openings and communicating with the interior of said outlet chamber, said body being formed with an internal port communicating between the inlet and outlet chambers and in substantial alignment with the intermediate opening, the entire valve having a cover removably secured over the intermediate opening and having a guide stem extending through said port and intermediate opening and having its opposite ends mounted in said body and cover, with a valve element in the outlet chamber mounted for movement along said guide stem toward and away from closing engagement with said port, and a flexible diaphragm connected to said valve element and extending in closing relation across said intermediate opening to define an expansile and contractile control chamber between said cover and diaphragm, the cover being provided with control-fluid passageway means for the passage of control fluid between said control and outlet chambers, the guide stem being hollow and defining a large through unrestricted open areaway which has its opposite ends communicating with said inlet and control chambers for passing relatively high-pressure fluid to said control chamber.

---

This invention relates generally to valves, and is especially concerned with hydraulic control valves.

It is an important object of the present invention to provide a hydraulic control valve which is capable of being more economically manufactured than heretofore possible, adapted to be fabricated of various materials including plastic, if desired, and which effectively minimizes flow disturbance to considerably reduce pressure drop across the valve.

It is another object of the present invention to provide a valve construction compatible with plastic or metal pipe, being connectable in a line by either solvent weld or bolted flange, or both.

It is another object of the present invention to provide a highly improved valve construction wherein operating controls are all conveniently located in a restricted area, permitting of burying or otherwise placing the valve in a position having access limited to one direction.

It is still another object of the present invention to provide a valve construction of the type described wherein control may be remote, either hydraulic or electrical, and wherein the remote control may be either normally closed or opened, as desired, to require minimum operating power.

Still another object of the present invention is to provide a valve having the advantageous characteristics mentioned in the preceding paragraphs, wherein actuating pressure is obtained from the fluid being handled by a unique construction which further serves to guide seating and unseating of the valve element.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figure 1:
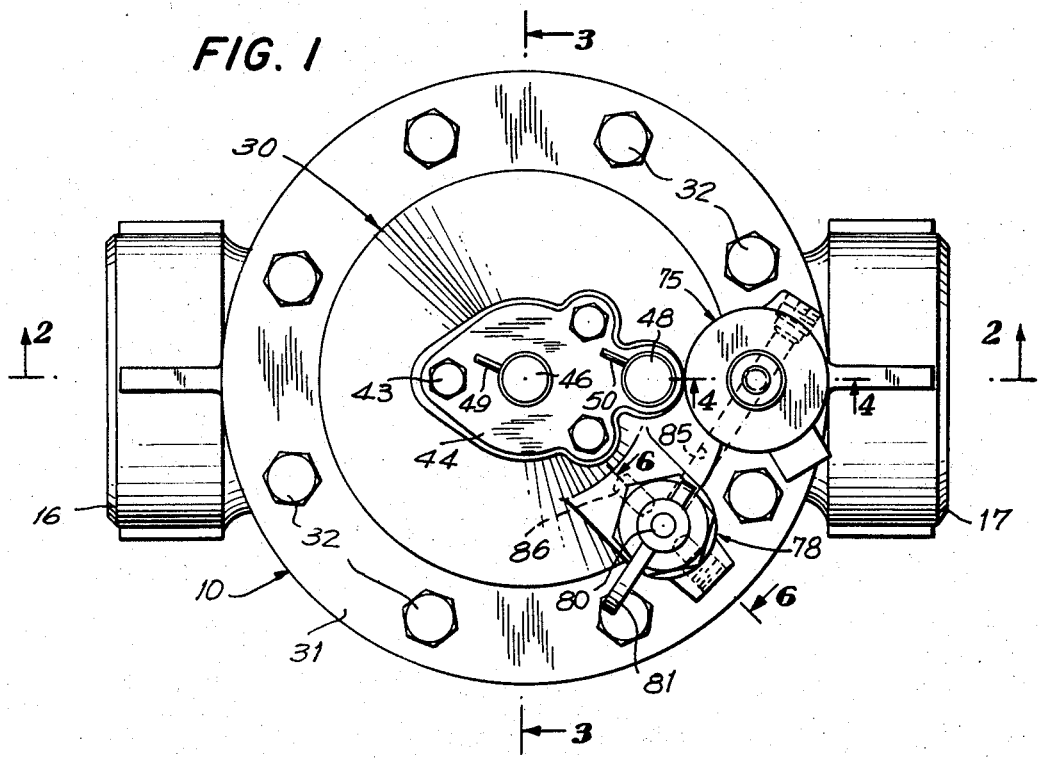
FIGURE 1 is a top plan view showing a valve constructed in accordance with the teachings of the present invention.
Figure 3:
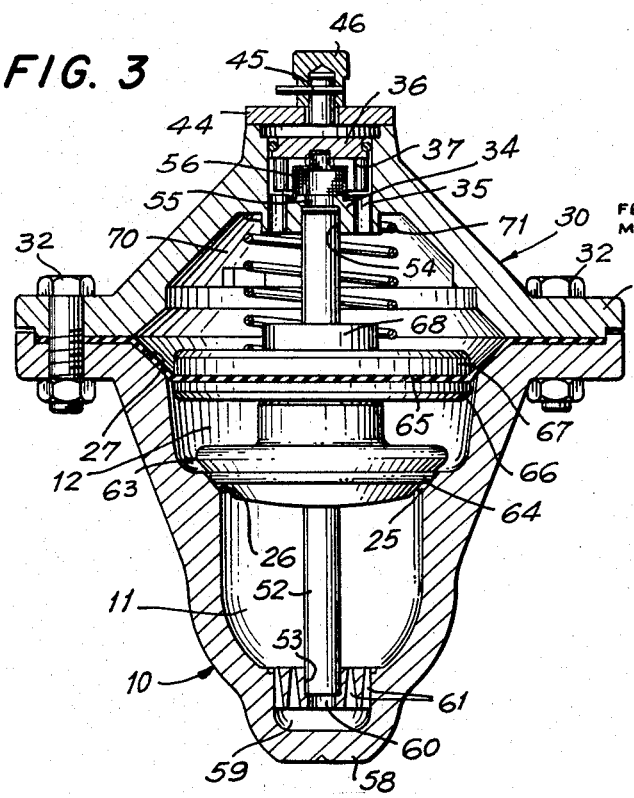
FIGURE 3 is a transverse sectional elevational view taken generally along the line 3—3 of FIGURE 1.
Figure 2:
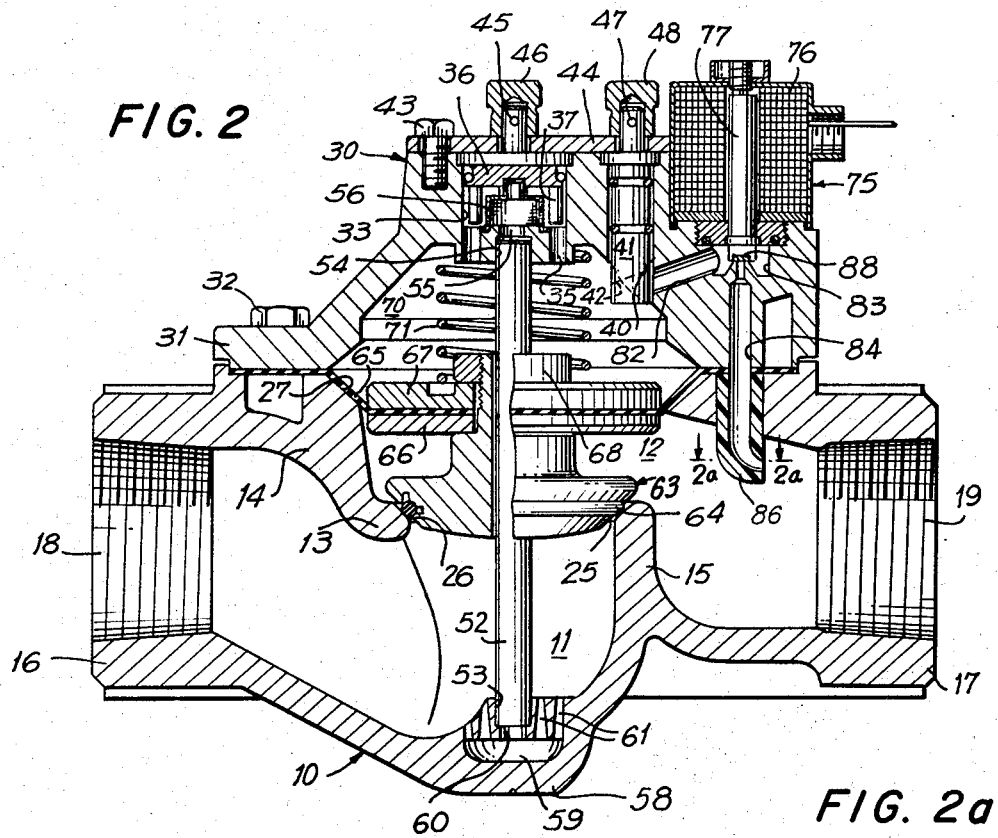
FIGURE 2 is a longitudinal sectional elevational view taken generally along the line 2—2 of FIGURE 1.
Figure 2A:
FIGURE 2a is a sectional view taken along the line 2a—2a of FIGURE 1.

Referring now more particularly to the drawings, and specifically to FIGURES 1–3 thereof, a valve body is generally designated 10 and is of generally elongate hollow configuration. Interiorly, the valve body 10 is separated into a pair of side-by-side chambers 11 and 12, the former being lower and the latter upper, as seen in FIGURE 2. Separating the chambers 11 and 12 is a generally horizontal wall 13 extending laterally between opposite sides of the body 10. At one end of the wall 13, the lefthand end, as seen in FIGURE 2, there is an upward extension or wall 14 to the top of body 10, and a downward extension or wall 15 extends from the righthand end of wall 13 to the lower side of body 10. At opposite ends of the body 10 are suitable connection elements, nipples, or flanges, as desired, the left-hand-end connection element being designated 17. Also, if desired, internal circumferential recesses may be provided at either or both ends 16, 17 of the body to facilitate solvent welding of plastic pipe. The connection elements 16 and 17 are generally annular, respectively defining an inlet end opening or passsageway 18 communicating with the chamber 11, and an outlet end opening or passageway 19 communicating with the chamber 12. The direction of flow through body 10 is from left to right, inward through the inlet opening 18 and outward through the outlet opening 19. The internal chamber 11 may thus be considered as an inlet chamber, and the internal chamber 12 may be considered as an outlet chamber.

The subdividing wall or partition 13 may be formed with a through opening or generally circular port 25 bounded by an annular upwardly facing valve seat 26. Directly above and in substantial alignment with the port 25, the upper side or wall of body 10 is formed with a through opening 27 spaced intermediate opposite ends of the body. The side opening 27 thus communicates directly through the upper wall body 10 with the outlet chamber 12.

Arranged over the side opening 27, and secured thereacross to the body 10, is a generally hollow, inwardly facing cover, generally designated 30. The cover 30 may include a circumferential flange 31 seated on the upper side of valve body 10 and detachably secured thereto, as by bolts 32, or other suitable securing means.

Directly over and in substantial alignment with the port 25 and intermediate side opening 27, the upper side of cover 30 is formed with a downwardly extending recess 33 terminating in a generally horizontal wall 34. The wall 34 is formed with a plurality of generally vertical through openings or holes 35 communicating between the recess 33 and the under or inner side of the cover 30. A plug 36 is rotatably engaged in the recess 33 and provided with a plurality of pins 37 depending toward the wall 33. The pins 37 are rotatable with the plug 36 to adjustably obstruct the holes 35 to a greater or less extent, as desired, for a purpose appearing presently.

The cover 30 is further provided with a generally vertical through hole 40 extending downward through the cover to the interior thereof and offset from the recess 33. A rotatable pin or plug 41 is engaged in the hole 40 and provided at its lower end with a transverse through opening or hole 42, for a purpose appearing presently. Secured over the upper end of the cover 30, as by fasteners or bolts 43, is a retainer or plate 44. The plate 44 retains the plug 36 and pin 41 in position against their vertical movement without limiting rotation of the same. Upstanding from the plug 36 through the plate 44 is a stud 45 covered by a cap 46, while a stud 47 upstands from the pin 41 through the plate 44 and is covered by a cap 48. Turning arms 49 and 50 are provided on the upper ends of studs 45 and 47, projecting generally radially from their caps 46 and 48, best seen in FIGURE 1. The turning arms 49 and 50 permit of manually adjusting the plug 36 and pin 41.

A guide stem or tube 52 extends generally vertically through the aligned port 25 and body side-wall opening 27. The guide stem or tube 52 has its opposite ends open, its lower end being received in a conforming recess 53 formed in the lower side or wall of body 10 and facing upwardly into the inlet chamber 11. The upper end of guide stem or tube 52 is conformably received in a recess 54 formed in the underside of and facing generally downward from the cover 30, below the recess 33. A through hole or aperture 55 is formed in the cover 30 extending generally vertically between the stem-receiving recess 54 and the plug-receiving recess 33 for communication of the tubular stem through the aperture 55 with the recess 33. An inverted, generally cup-shaped strainer 56 may be seated in the recess 33 beneath the plug 36 in the space between pins 37.

The lowermost or bottom wall region 58 of valve body 10 is formed with a chamber or cavity 59 directly below the stem-receiving recess 53 and communicating with the latter through an aperture 60. In addition, one or more holes 61 are formed in the bottom body region 58 communicating between the interior of inlet chamber 11 and the recess or cavity 59. The recess 53, its associated aperture 60 and cavity 59 may be considered as a well in fluid communication with the lower end of guide tube 52, while the recess 54, associated aperture 55 and upper recess 33 may be considered as an inverted well in fluid communication with the upper end of the guide tube.

A valve element 63 of generally plug-like configuration is located in the outlet chamber 12 and slidably circumposed about the guide tube 52 for movement vertically therealong into and out of closing engagement with the seat 26 of port 25. An annular seal or O ring 64 is carried by the valve element 63 extending thereabout and in sealing engagement with the seat 26 when the valve element is in its lowermost, closed position.

Sandwiched between the upper side of valve body 10 and flange 31 of cover 30 is a flexible sheet, membrane or diaphragm 65. The diaphragm 65 extends in closing relation across the intermediate or side opening 27 of body 10 and is centrally secured to the valve member 63 by any suitable means, such as a pair of gripping plates 66 and 67 circumposed about the valve element and secured in clamping relation with respect to the diaphragm by a clamping nut 68. Thus, the diaphragm 65 combines with the interior of the cover 30 to define therebetween a control chamber 70. Suitable resilient means, such as a coil compression spring 71 may be interposed between the underside of cover 30 and upperside of top diaphragm clamping plate 67 to resiliently urge the valve member 63 downward.

It will now be appreciated that fluid communication normally exists between the inlet chamber 11, through the well 59, 60 and 61, tube 52, and well 55, 33, 35 with the interior of the control chamber 70. The rate of fluid flow between the inlet chamber 11 and control chamber 17 may be adjusted by rotation of arm 49 to adjust the amount of obstruction by pins 37 of holes 35.

Figure 6:
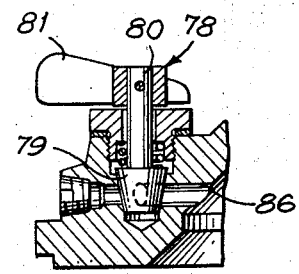
FIGURE 6 is a partial sectional elevational view along the line 6—6 of FIG. 1, showing a manual control valve for use either with or in place of a control solenoid.

Mounted exteriorly on the cover 30 adjacent to the cap 48 is a solenoid 75 including an upstanding coil 76 and a generally vertical plunger 77 within the coil. Also mounted on the upper side of cover 30 is a manually operable valve 78 (FIGS. 1 and 6), which may include a plug 79 rotatable in the cover and an upstanding stem 80 carrying a handle 81. The cover is formed with a fluid passageway or bore 82 communicating transversely through the lower end of hole or bore 40 with a recess 83 beneath the solenoid plunger 77. An additional passageway or bore 83 communicates generally vertically downward from the recess 83 to the outlet passageway 19 of the valve body 10.

Depending from the lower end of the passageway 84 into the outlet passageway 19 may optionally be located a Venturi-type Pitot tube, having its lower end facing downstream, for a purpose appearing presently.

Further, an internal passageway or bore 85 (see FIG. 1), may be formed in the cover 30 communicating between the recess 83 and the plug 79 of manual valve 78. An additional fluid passageway or bore 86 is formed in the cover 30 communicating between the control chamber 70 and plug 79 of valve 78.

Figure 4:
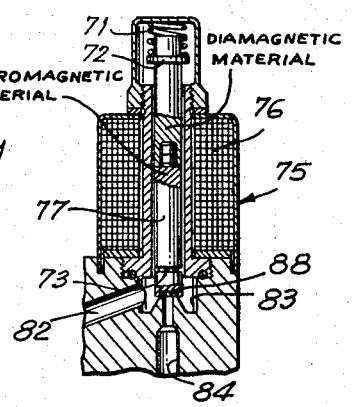
FIGURE 4 is a sectional elevational view along the line 4—4 of FIG. 1, showing in greater detail a normally closed control solenoid of the instant valve.

For remote-control operation, the valve 78 may remain closed. In the embodiment of FIGURE 4, the solenoid 75 is normally closed, the plunger 77 being provided on its lower end with a valve element 88 movable into and out of closing relation with the passageway 84. Being normally closed, the solenoid 75 requires actuation to shift the plunger 77 upward and open the passageway 84. Thus, in the normally closed solenoid condition, fluid pressure from the inlet chamber 11 is communicated through the tube 52 to the control chamber 17 where it is impressed upon the diaphragm 65 which, together with the force of spring 71, maintains the valve member 63 closed. Upon actuation of the normally closed solenoid 75 to shift its plunger upward, pressure in the control chamber 70 is released through the passageway 82, recess 83 and passageway 84, for opening of the valve member 63. The plug 41 and its transverse bore 42 may be rotated by means of arm 50 to swing the plug into greater or less obstruction of the passageway 82. In this manner, the speed of opening of the valve member 63 may be selectively adjusted.

Figure 5:
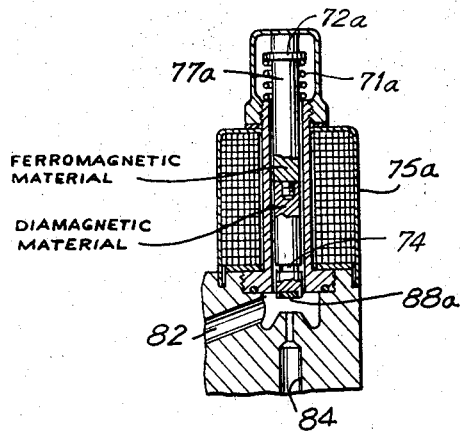
FIGURE 5 is a sectional elevational view similar to FIGURE 4, but showing the normally open arrangement of control solenoid.

With a normally open solenoid, as at 75a in FIGURE 5, the plunger 77a is normally raised to lift the valve element 88a to its open position. Thus, the valve member 63 is normally raised by the difference of pressure between the inlet chamber 11 and outlet chamber 12, and only upon actuation of the solenoid 75a to close the passageway 84 is the valve element 63 moved to its closed, downward position.

As is apparent from the legend in FIGURES 4 and 5, the solenoid plunger 77 and 77a is of a two-part or sectional construction having a pair of sections secured in end-to-end relation. One section is of ferromagnetic material, the lower section in FIGURE 4, and the other section is of diamagnetic material, the upper section, in FIGURE 4. The plunger 77, 77a is provided at opoposite ends with circumferential grooves 73 and 74, the former being formed in the ferromagnetic material and the latter being formed in the diamagnetic material, and each adapted to selectively receive a collar or spring ring 72 as indicated in FIGURE 4, and designated 72a in FIGURE 5.

In the arrangement indicated in FIGURE 4, the collar 72 is circumposed about the diamagnetic plunger section, and a spring 71 is arranged about the plunger in bearing engagement with the upper side of the collar 72 to resiliently urge the plunger downward. In this condition, the passageway 84 is normally closed by the lower end of plunger 77, and energization of solenoid coil 76 serves to raise the plunger 77 against the action of spring 71 to open the passageway 84.

In the arrangement shown in FIGURE 5, the ferromagnetic plunger section is uppermost, the collar 72a being engaged in the groove 73, and the spring 71a being resiliently engageable with the underside of the collar to urge the plunger upward to a normally open position with respect to the passageway 84. In this condition, energization of the solenoid 75a is required to close the passageway 84. Of course, this closure of the passageway 84 effects closure of the valve element 63, as described hereinbefore, while opening of the passageway 84 serves to open the valve element 63.

It will now be appreciated that the valve device of the present invention is possessed of great versatility in that it may be converted between a normally open valve and a normally closed valve by mere change in position of the plunger 77 and spring 71, as between the arrangements of FIGURES 4 and 5. Obviously, this serve to greatly reduce manufacturing costs, and minimize inventory requirements, as well as affording versatility to an individual valve.

While the use of Venturi-type Pitot tube 86, as seen in FIGURE 2, may not always be desirable or required, it is advantageous in larger-size valves to insure the discharge of line pressure to the downstream chamber, even under minimum pressure-differential conditions. Thus, the venturi action of tube 86 insures maximum opening of the operating chamber under all conditions of use.

In addition, manual control may be effected by operation of valve 78. With the plug or pin 41 rotated to close passageway 82, and the solenoid plunger raised, the valve plug 79 may be rotated to open and close communication between the control chamber 70 and outlet passageway 19, as desired for opening and closing the valve member 63.

From the foregoing, it is seen that the present invention provides a valve construction which fully acomplishes its intended objects and is well adapted to meet practical conditions of manufacture, installation, maintenance and use.

Although the present invention has been described in some detail by way of illustration and example for purposes of clarity of understanding, it is understood that certain changes and modifications may be made within the spirit of the invention and scope of the appended claims.

What is claimed is:

1. A valve construction comprising a valve body having internally thereof a pair of inlet and outlet chambers and a pair of spaced inlet and outlet openings communicating with respective inlet and outlet chambers, said body having an intermediate opening spaced between said inlet and outlet openings and communicating with the interior of said outlet chamber, said body being formed with an internal port communicating between said inlet and outlet chambers and in substantial alignment with said intermediate opening, a cover removably secured over said intermediate opening, a guide stem extending through said port and intermediate opening and having its opposite ends mounted in said body and cover, a valve element in said outlet chamber and mounted for movement along said guide stem toward and away from closing engagement with said port, and flexible diaphragm means connected to said valve element and extending in closing relation across said intermediate opening to define an expansile and contractile control chamber betwen said cover and diaphragm, said cover being provided with control-fluid passageway means for the passage of control fluid between said control and outlet chambers, said guide stem being provided wtih a large through unrestricted open areaway having its opposite ends communicating with said inlet and control chambers, for passing relatively high-pressure fluid to said control chamber.

2. A valve construction according to claim 1, said control-fluid passageway means comprising a control passageway communicating between said control and outlet chambers, and a control valve in said control passageway for opening and closing said control chamber to said outlet chamber.

3. A valve construction according to claim 2, in combination with resilient means in said control chamber resiliently urging said valve element toward its closing engagement with said port.

4. A valve construction according to claim 3, in combination with obstruction means movably mounted in said cover for selectively varying obstruction of communication between said stem passageway and control chamber, to thereby vary the closing speed of valve-element movement.

5. A valve construction according to claim 3, in combination with obstruction means movably mounted in said cover for selectively varying obstruction of said control-fluid passageway means, to thereby vary the opening speed of valve-element movement.

6. A valve construction according to claim 1, said guide stem comprising a hollow open-ended tube, and said valve body and cover being provided with generally aligned wells respectively communicating with said inlet and control chambers and receiving opposite ends of said tube.

7. A valve construction comprising a valve body having internally thereof a pair of inlet and outlet chambers and a pair of spaced inlet and outlet openings communicating with respective inlet and outlet chambers, said body having an intermediate opening spaced between said inlet and outlet openings and communicating with the interior of said outlet chamber, said body being formed with an internal port communicating between said inlet and outlet chambers and in substantial alignment with said intermediate opening, a cover removably secured over said intermediate opening, a guide stem extending through said port and intermediate opening and having its opposite ends mounted in said body and cover, a valve element in said outlet chamber and mounted for movement along said guide stem toward and away from closing engagement with said port, and flexible diaphragm means connected to said valve element and extending in closing relation across said intermediate opening to define an expansible and contractile control chamber between said cover and diaphragm, said cover being provided with control-fluid passageway means for the passage of control fluid between said control and outlet chambers, said guide stem being provided with a through passageway having its opposite ends communicating with said inlet and control chambers for passing relatively high-pressure fluid to said control chamber, said control-fluid passageway means comprising a control passageway communicating between said control and outlet chambers, and a control valve in said control passageway for opening and closing said control chamber to said outlet chamber, said control valve comprising a solenoid coil, a solenoid plunger movable in said coil between positions opening and closing said control passageway, said plunger being selectively magnetically reversible in said coil for movement in a selected direction through said coil upon energization thereof.

8. A valve construction according to claim 7, in combination with resilient means selectively engageable with said plunger to urge the latter in a selected direction of movement within said coil for yieldably maintaining said control passageway in a desired condition.

9. A valve construction according to claim 7, in combination with a Pitot-type Venturi tube extending from said control passageway into said outlet chamber for educing control fluid under all operating conditions.

References Cited

UNITED STATES PATENTS

| | | | |
|---|---|---|---|
| 1,614,468 | 1/1927 | Haas | 251—46 X |
| 2,417,994 | 3/1947 | Sheets | 251—45 X |
| 2,543,846 | 3/1951 | Griswold | 251—46 X |
| 2,948,298 | 8/1960 | Gardner | 137—270.5 |

M. CARY NELSON, *Primary Examiner.*

A. ROSENTHAL, *Examiner.*